United States Patent [19]

Holt

[11] Patent Number: 5,177,891

[45] Date of Patent: Jan. 12, 1993

[54] GAME FISH ATTRACTING DEVICE

[76] Inventor: Steven P. Holt, 664 Bradford Pl., N.E., Grand Rapids, Mich. 49546

[21] Appl. No.: 553,970

[22] Filed: Jul. 17, 1990

[51] Int. Cl.$^5$ .............................................. A01K 79/00
[52] U.S. Cl. ...................................................... 43/17.1
[58] Field of Search .......................... 43/17.1, 42.31; 340/394, 387, 388, 321; 367/152, 162, 176

[56] References Cited

U.S. PATENT DOCUMENTS

| | | |
|---|---|---|
| 2,577,229 | 8/1949 | Carnes . |
| 2,757,475 | 8/1956 | Pankove ........................... 43/42.31 |
| 2,784,399 | 4/1956 | Smith . |
| 2,920,318 | 2/1957 | Balcken et al. . |
| 2,932,110 | 4/1957 | Kilpinen et al. . |
| 2,939,240 | 6/1959 | Goodman . |
| 3,105,233 | 8/1962 | D'Amore et al. . |
| 3,120,073 | 2/1961 | Brunton . |
| 3,310,902 | 11/1964 | Godby . |
| 3,416,254 | 7/1966 | Bornzin . |
| 3,683,356 | 8/1972 | D'Amore . |
| 3,885,338 | 5/1975 | York ...................................... 43/17.1 |
| 4,583,313 | 4/1986 | Dugan, Jr. . |
| 4,805,339 | 2/1989 | Fuentes et al. . |
| 4,955,005 | 9/1990 | Loeffelman ......................... 43/17.1 |

OTHER PUBLICATIONS

Attracting Fish by Sound, *World Fishing*, 13, 9 (Jan. 1964) abstract.
Text entitled "The Behavior of Teleost Fishes", edited by Tony J. Pitcher, 1986, John Hopkins University Press; Chaper 5, Underwater Sound and Fish Behavior (pp. 114-151), Chapter 7, Role of Lateral Line in Fish Behavior (pp. 177-202).

*Primary Examiner*—Kurt C. Rowan
*Attorney, Agent, or Firm*—Varnum, Riddering, Schmidt & Howlett

[57] ABSTRACT

Underwater acoustical signals or "signatures" produced by various species of fish bait or representing water surface disturbances are recorded by means of underwater recording devices and stored in the form of digital signals in memory devices. A memory device containing data representing the signature of a particular species of fish bait may be installed in a lure or other underwater housing together with an output transducer and the acoustical signal corresponding to the signature of fish bait is broadcast underwater to attract game fish. An integrated circuit chip containing circuitry for reading the memory chip is included in the lure together with a battery which provides power for the integrated circuit chips. The memory and the circuitry which reads the memory and drives the output transducer are provided in separate integrated circuit chips and mounted on one or more printed circuit boards inside the lure or housing. The memory is in the form of a pluggable read-only memory. The lure or housing may be readily opened and the pluggable memory may be readily replaced by another memory containing the prerecorded signature of a different species of bait in order to attract a particular species of game fish. Alternatively, the memory device may be inserted in an on-board computer and interface circuitry connected to the computer drives one or more underwater output transducers broadcasting the signatures.

22 Claims, 5 Drawing Sheets

GAME FISH ATTRACTING DEVICE

BACKGROUND OF THE INVENTION

1. Field of the Invention

This invention pertains to devices for attracting fish and more particularly to such devices which emit acoustical signals to attract game fish.

2. Prior Art

It has long been known that acoustical signals are both generated and detected by fish and are important communications media for fish. A wide range of species of fish emit sounds and several species are known to be acutely sensitive to underwater sounds. Vibratory disturbances or underwater sound are detected through a specialized sense organ known as the acoustic-lateral line. Certain species appear to transmit an acoustical signal unique to the species and equivalent to a "signature." In addition, it has long been known that game fish behavior is modified during periods of weather disturbances which create sounds transmitted from the surface (e.g., wind, surf, rain, etc.) which may be referred to as "weather signatures." Sound production occurs in fish as part of their normal social behavior or when disturbed by a predator or subjected to other stimuli. Many fish produce calls as part of a particular behavior and the sounds are believed to elicit a change in the behavior of other fish of the same or different species. Calls may be made by stridulatory sounds produced by fish rubbing hard parts of the body together and resulting in a series of very rapidly produced and irregular transient pulses, containing a wide range of frequencies. Certain species of fish produce grating sounds, others produce squeaking or clapping or thumping sounds. A particular sound is produced by fish swimming or rapidly turning. Injured or distressed prey may produce sound signatures recognizable by predator fish. In certain species, different calls may be produced in different contexts and variations in calls may be in the form of pulse modulation or changes in the frequency structure. Studies have shown that certain fish species emit specific vibratory disturbances in the context of social behavior, such as social aggregation, and different vibratory disturbances in association with reproductive behavior. Certain predatory fish appear to be adept at detecting sounds, and particularly adept at homing in on the signature of a particular species of prey. There are studies which suggest that fish are able to discriminate among calls by distinguishing between signals on the basis of differences in frequencies as well as pulse rates, and even able to distinguish between signals that differ only in amplitude. Experiments have shown fish generally are sensitive to sounds only in the low-frequency range, below 10 kHz, and many species are sensitive only to sounds below 500 Hz.

For many years, the fishermen have attempted to produce underwater sounds in order to attract fish, and hopefully fish of a particular type, by means of lures that produce a vibration underwater. A number of vibrating lures have been proposed in the prior art which purport to attract fish by electrically or mechanically generating and transmitting signals of different pulse rates or different frequencies. However the prior art devices generate basically repetitive signals with no particular relationship to the comparatively complex signal structure emitted by fish. Particularly, the prior art devices do not provide a means for accurately generating signals which correspond to sound produced by a selected species of bait, such as is desirable in attracting certain species of game fish. The following are examples of prior patents directed to underwater signal-producing devices.

The prior patent, U.S. Pat. No. 2,784,399 to T. P. Smith (dated Mar. 5, 1957) discloses a sound producing fishing lure for transmitting sounds through the water. The lure includes an electromagnet and a vibrating armature contacting a metallic diaphragm to produce a buzzing sound. An inertia-responsive mercury switch causes the electromagnet to be operated intermittently, on a random basis, as the orientation of the lure changes due to wave motion or the like.

The U.S. Pat. No. 2,920,318 to H. A. Balcken et al. (dated Jan. 5, 1960) discloses a fish caller in the form of a cylindrical device adapted to be suspended from a fish line or the like. The unit includes a buzzer provided with a screw adjustment to regulate the pitch of the resulting sound produced by the buzzer.

The U.S. Pat. No. 4,583,313 to C. J. Duggan, Jr. (dated Apr. 22, 1986) discloses a fishing lure intended to emit signals of different frequencies in order to attract the fish of a particular species. The lure is described as employing a piezoelectric transducer driven by an integrated circuit oscillator adjustable to produce various frequencies in a range from 1 Hz to 100 kHz by the changing of circuit components.

The U.S. Pat. No. 4,805,339 to Fuentes et al. (dated Feb. 21, 1989) discloses a sonic fishing lure employing a pair of astable multivibrators to produce underwater sound. A 1 Hz and a 100 Hz multivibrator are used together to provide intermittently pulsed outputs at approximately 100 Hz for a duration of approximately 700 milliseconds separated by non-sound producing time periods of approximately 200 milliseconds.

A limitation of the these and other prior art devices is that while they produce underwater sounds purported to attract fish, it is not known whether the sounds produced by the prior art lures correspond to sounds of bait to which game fish respond. Furthermore, fish appear to produce acoustical signals which vary in signal frequency, periodicity and amplitude. Such complex signals are not readily reproduced by buzzers or other devices which generate signals of fixed frequency, duration and amplitude or which are varied in an arbitrary manner. Prior art lures generally have lacked an effectiveness in attracting fish. An apparent reason is that the appropriate complex acoustical signal patterns to which fish react have not been generated by the prior art devices. Studies have shown that certain game fish have a preference for and seem to be able to select certain bait fish, presumably on the basis of acoustical signals transmitted by the bait fish which allow the predator to discriminate among the bait. Acoustical patterns which allow such discrimination do not appear to be generated by prior art lures.

SUMMARY OF THE INVENTION

These and other problems of the prior art are overcome in accordance with the present invention by the underwater reproduction of acoustical signals detected in water. Advantageously, such reproduced signals accurately reflect complex signal variations found in underwater signals from a variety of sources which act to stimulate the acoustic-lateral line to cause changes in behavior of game fish. The underwater vibratory disturbances or sound signals may be any behavior-modifying signal detectable underwater and generally referred to as sounds, and may include signals produced by surface weather disturbances, surface bait such as insects, crustaceans such as crawfish and the like, bait fish signatures, and underwater disturbances produced by fish swimming or rapidly turning or generated in association with social or reproductive behavior of fish. The reproduced signals advantageously are recognizable by game fish in the same manner as the naturally occurring signals. This invention represents a technological breakthrough over prior art acoustical lures or the like which randomly generate signals of a fixed or a variable frequency without any relevance to naturally-occurring acoustical signals.

In accordance with this invention, a device for attracting fish includes an acoustical transducer, and electronic circuitry for reproducing prerecorded underwater signals that influence game fish behavior. In accordance with one aspect of the invention, information representative of recorded underwater sounds is stored in a memory device and the recorded sounds are reproduced underwater by converting the stored data to acoustical signals by means of electronic circuitry and an underwater transducer. Advantageously, the memory device may be a replaceable device such that signal representations of a variety of sounds will be available to the fisherman and different calls or surface conditions may be simulated by simply replacing the memory device with another.

In one embodiment of the invention, a fish-attracting device comprises a watertight housing and an inner spatial area for containing a memory device having stored therein digital data representing samples of prerecorded acoustical signals and electronic circuitry for reading the contents of the memory and for applying corresponding electrical signals to an acoustical transducer, to thereby broadcast underwater acoustical signals emulating the sounds of fish bait and surface conditions.

In one specific embodiment of the invention, the memory device contained in the housing comprises an integrated circuit read-only memory mounted on a printed circuit board and an integrated circuit. The integrated circuit includes a memory address counter for sequentially applying memory read addresses to the read-only memory, gating circuitry controlled by the timer circuit for periodically applying data read from memory to a digital-to-analog convertor, and an amplifier which provides an amplified convertor output to an acoustical output transducer. Calls of a plurality of different species of bait or surface conditions may be emulated by prerecording their sounds in the same or different memories.

In accordance with one aspect of the invention, an acoustical transducer may be disposed below the surface of a body of water and circuitry for generating and transmitting input signals for the transducer is disposed in a boat or like accessible place. In accordance with one embodiment of the invention, the circuitry for generating and transmitting transducer input signals comprises a computer provided with a removable disk memory device to allow for the broadcast of different underwater sounds by replacement of the disk memory device. The disk memory device, which stores digital data representative of acoustical signatures recognizable by game fish, is selectively read by the computer, and interface circuitry connected between the computer and the transducer provides electrical signals to the transducer, which broadcasts the bait signature underwater.

In accordance with one aspect of the invention, memories containing information representing a particular species of bait may be produced by isolating fish or other bait of a preferred species, in a tank or like isolating environment, and recording digital data defining the acoustical signals produced over a period of time using an underwater transducer. The recording may be made under selected conditions to record specific signals such as those produced, for example, in connection with certain social behavior or reproductive activities. Weather signatures representing different surface disturbances may be recorded in a similar fashion when the specific weather conditions are present. The digital data may then be permanently recorded in an integrated circuit read-only memory device or disk memory in a digital format. Advantageously, a number of such memories may be produced to be used in broadcasting the particular acoustical signals or signature of a known species. In a similar manner, several different sounds may be recorded to produce memories which each contain several signatures to be used in fishing for the different kinds of game fish and simulating different surface conditions.

BRIEF DESCRIPTION OF THE DRAWING

The invention will be described with reference to the drawing, in which.

DETAILED DESCRIPTION

Figure 1:
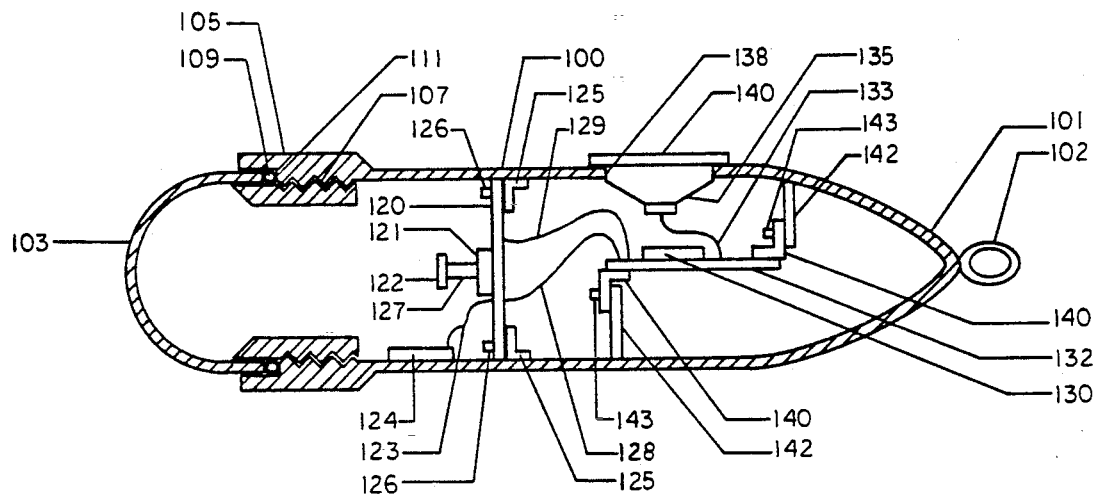
FIG. 1 is a longitudinal sectional view of a fishing lure incorporating the principles of their invention.

FIG. 1 is a sectional view of an illustrative embodiment of a device in the form of a fishing lure 100 for attracting fish by reproducing acoustical signals or vibratory disturbances, generally referred to as "sounds" herein, underwater. Lure 100, which may be made of plastic or other suitable material, has a front section 101 and a rear section 103 and is provided with an attachment loop 102 for attachment to a fishing line. The lure will have one or more standard fish hooks (not shown) attached to it. The front section 101 has an area of increased diameter 105 provided with threads 107 formed around its circumference for receiving mating threads of the rear section 103. A watertight seal is obtained between the front and rear sections by means of an 0-ring gasket 109 supported on a radially projecting shoulder 111 on the front section 101. Contained within the front section 101 is a circuit board 120 having mounted thereon a pluggable read-only memory (ROM) 122. The circuit board 120 is provided with a connector 121, and ROM 122 is provided with external conductors 127 for pluggably engaging connector 121, allowing for convenient removal of ROM 122. Another ROM, defining the signature of another species of bait, may be readily inserted in connector 121 to cause the lure to reproduce the sound of the other species, to attract a the same or different species of game fish. The circuit board may be fastened to brackets 125 by means of standard fasteners 126 which are readily accessible when the rear section 103 has been separated from the front section 101. A battery 124 is connected to circuit board 120 via conductor 123. The printed circuit board 120 is provided with conductors for making the necessary electrical connection to provide power from the battery 124 to ROM 122. Circuit board 120 has conductors which extend through circuit board 120, in a standard fashion, to make connection from conductor 123 to conductor 128 to provide power to integrated circuit 130 mounted on a second printed circuit board 132. Printed circuit board 132 may be fastened by means of brackets 140 mounted on printed circuit board 132 to brackets 142 attached to the internal surface of the front section 101 by means of fasteners 143 in a standard fashion. Fastener 143 will be accessible when the rear section 103 and printed circuit board 120 have been removed. Connection is provided from ROM 122 to integrated circuit 130 via printed circuit boards 120 and 132 and interconnecting conductor 129. Further electrical connection is provided from integrated circuit 130 via printed circuit board 132 and conductor 133 to speaker 135. Speaker 135 is aligned with opening 138 in the side wall of front section 101. A relatively flexible watertight diaphragm 140, sealed with a watertight seal on the outside of front section 101, covers opening 138. The diaphragm may for example be made of a plastic material and is used to transmit sound signals generated by speaker 135 underwater when lure 100 is submerged. The electronic components including ROM 122, battery 124, integrated circuit 130 and speaker 135 are representative of corresponding circuitry shown in FIG. 4, and described later herein.

Figure 2:
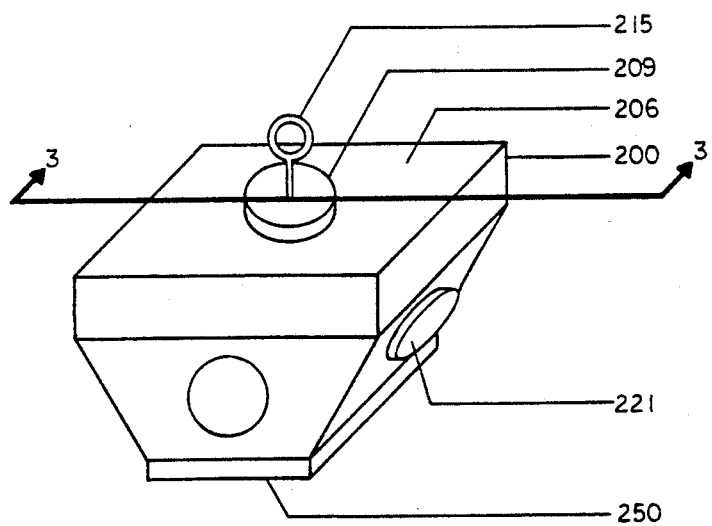
FIG. 2 is a perspective view of an alternate embodiment of a device for attracting game fish in accordance with the invention.
Figure 3:
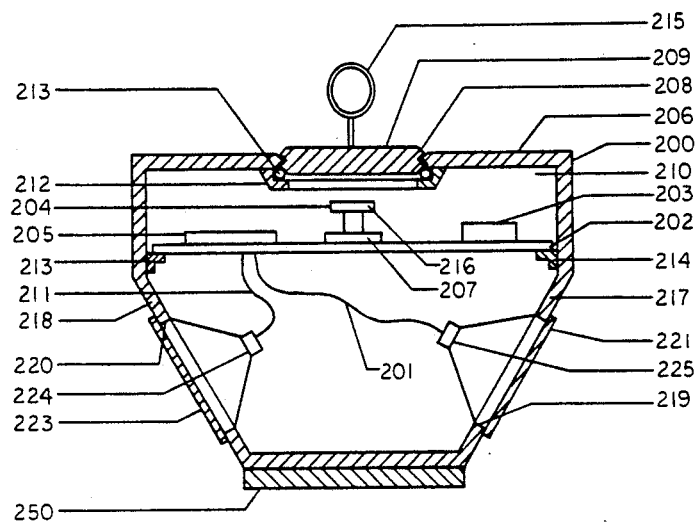
FIG. 3 is a cross section taken along line 3—3 of FIG. 2.

FIG. 2 is a perspective view of an alternate embodiment of a housing for containing electronic equipment used in the underwater reproduction of prerecorded sound for the purpose of attracting game fish to lures in the vicinity of the housing. FIG. 3 is a cross-sectional view of the housing 200 of FIG. 2 along line 3—3. The housing 200, which may be made of plastic or other suitable material, is provided with an upper wall 206 having a threaded opening 208 to allow access to the internal spatial area 210 of the housing 200. A radially projected shoulder 212, integral to the upper wall 206, supports an O-ring seal 213. A threaded cap 209 engages the threaded opening 208 to form a watertight seal with O-ring 213. A ring 215 is provided to suspend the housing 200 underwater in the vicinity of fishing lures. A lead weight 25 is attached to the housing 200 to assure that the housing will submerge when suspended from ring 215.

Sound is reproduced underwater by means of speakers 224, 225 and electronic circuitry contained in integrated circuit 205 on the basis of prerecorded data stored in a pluggably removable read-only memory (ROM) 204. The integrated circuit 205 together with ROM 204 and a battery 203 are mounted on a printed circuit board 202 which is attached to the housing 200 by means of attachment brackets 213, 214 in a standard fashion. Circuit board 202 is provided with a connector 207 for pluggably receiving external conductor 216 of ROM 204, so that the ROM may be readily removed and replaced with another defining the signature of another species of bait. The printed circuit board 202 is provided with printed circuit conductors, in a standard fashion, to provide the necessary connections from the battery 203 to ROM 204 and integrated circuit 205, as well as the required connections for allowing the integrated circuit 205 to access and receive data from the ROM 204. The printed circuit board 202 includes connections extending through the board from the integrated circuit 205 to conductors 201 and 211 connecting the integrated circuit 205 to speakers 224 and 225. Speakers 224 and 225 are aligned with openings 219 and 220. Openings 219 and 220 are covered by tightly stretched watertight diaphragms 221, 223 sealed on the outside of the housing 200 with a watertight seal. Acoustical signals reproduced at the speakers 224, 225 are transmitted via diaphragms 221, 223, respectively, as underwater sound when the housing 200 is submerged. Housing 200 is provided with angularly extending walls 217, 218 to project underwater sound in a direction extending angularly to the top surface of the water in which the housing 200 is submerged, in order to project the acoustical signal outwardly and downwardly.

Figure 4:
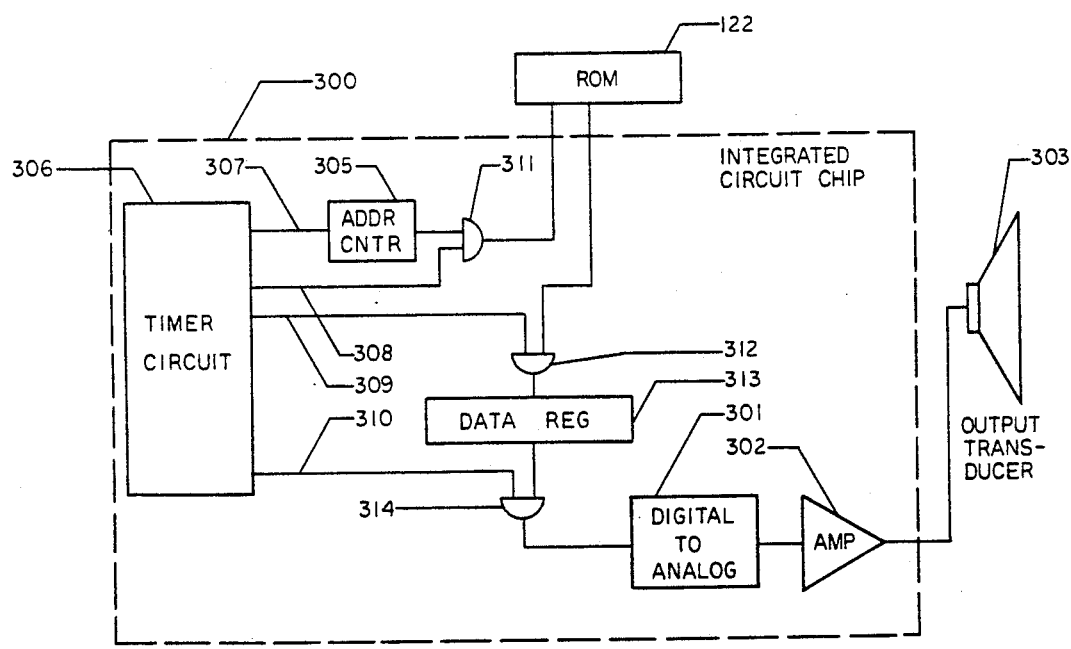
FIG. 4 is a block diagram representation of an illustrative circuit for reproducing underwater sound from prerecorded signals.
Figure 5:
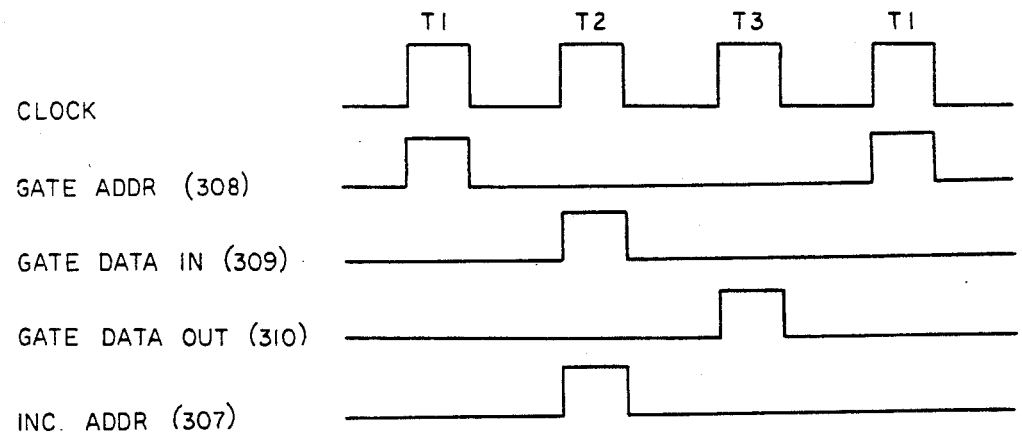
FIG. 5 is an illustrative timing diagram referring to signals employed in the circuit of FIG. 4.

FIG. 4 illustrates diagrammatically the circuit details of circuitry for the production of underwater acoustical signals from recorded data as may be used in underwater housings described above with respect to FIGS. 1 and 3. A read-only memory, e.g., ROM 122, contains digital data representing the recorded acoustical signals or signature produced by a particular bait species. The digital data stored in the ROM 122 is read and converted to analog form by means of a digital-to-analog convertor 301. The analog signal is amplified by means of a standard amplifier 302 and applied for broadcast to an output transducer 303. Output transducer 303 may be one or more known loudspeaker devices operating in a range of approximately 30 Hz to 5 kHz to transmit the reproduced sound. Since many fish appear to be insensitive to sound outside of a range of 30 Hz to 500 Hz, output transducers having appropriate output characteristics within that range will be suitable for many types of fish. ROM 122 will normally have a plurality of memory locations, each having a data word comprising a plurality of bits, e.g., 8 bits. Each memory location is addressed by transmitting an address comprising the contents of address counter 305 to ROM 122. The number of data words in the ROM is a matter of design choice, but there should be sufficient data to represent a significant duration acoustical signal. Furthermore, it may be desirable to store signature data for more than one species of bait fish in sequence. The address counter 305 is incremented periodically to sequentially cycle through all of the data locations in the ROM 122. Address counter 305 is a recirculating counter which will return to an all-zero state. Accordingly, the memory will be read in repetitive cycles. In this manner the acoustical signal defined by the data in the memory will be broadcast repeatedly. The address counter is incremented from a commercially available timer circuit 306 which repetitively produces a number of clock pulses. FIG. 5 shows a timing diagram showing output clock pulses T1 through T3 generated by the timer circuit 306. By way of example, FIG. 5 shows that address counter 305 is incremented via address lead 307 by means of the T2 timing pulse. The T1 timing pulse is provided on lead 308 and applied to AND gate 311 together with the output of the address counter 305 to transmit an address to the ROM 122. Timing pulse T2 is transmitted via lead 309 to AND gate 312 which is activated by pulse T2 to gate a data word from ROM 122 to data register 313. Timing pulse T3 is applied via lead 310 to AND gate 314 to apply the data word stored in the data register 313 to the digital-to-analog convertor 301. The rate of operation of timer circuit 306 is a matter of design choice, depending on the frequency at which data is to be read from memory, which in turn is a function of the frequency of sampling by which recorded data was generated. The circuitry shown within the dashed line box 300 may be included in a single integrated circuit chip or a plurality of chips mounted on a printed circuit board for ease of installation in the relatively small space of a lure.

Figure 6:
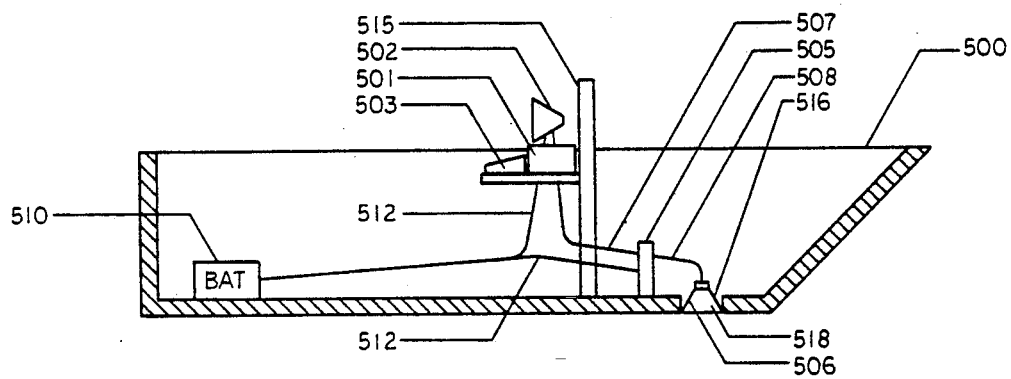
FIG. 6 is an alternate embodiment of the invention, employing an on-board computer.

FIG. 6 represents an embodiment of the invention in which the circuitry and equipment for reproducing sound underwater are incorporated in a boat. The boat 500, the hull of which is shown in cross-sectional elevation, includes an onboard computer 501 provided with a display screen 502 and a keyboard 503. The computer 501, which may be any of a number of types of commercially available, relatively inexpensive computers, or may comprise circuitry such as that described above with respect to FIG. 4, will include a memory in which prerecorded data representing underwater sounds produced by fish bait are stored. The computer reads the data from memory and transmits the data to interface circuit 505 via conductor 507. The interface circuit provides an analog signal to acoustical transducer 506 via conductor 508. A boat battery 510 provides power to the computer 501 and interface circuit 505 via conductors 512. The hull 500 is provided with a console 515 for supporting computer 501 and associated equipment. The transducer 506 may be placed in an opening 516 in the hull 500 which is covered by means of a watertight cover 518 which may be made of plastic or other suitable material through which the acoustical signals are transmitted into the water. Alternatively, as a matter of design choice, a transducer may be placed on the inside of the hull 500, transmitting the signals through the hull, or may be appropriately encased and fastened to the outside of the boat below the waterline.

Figure 7:
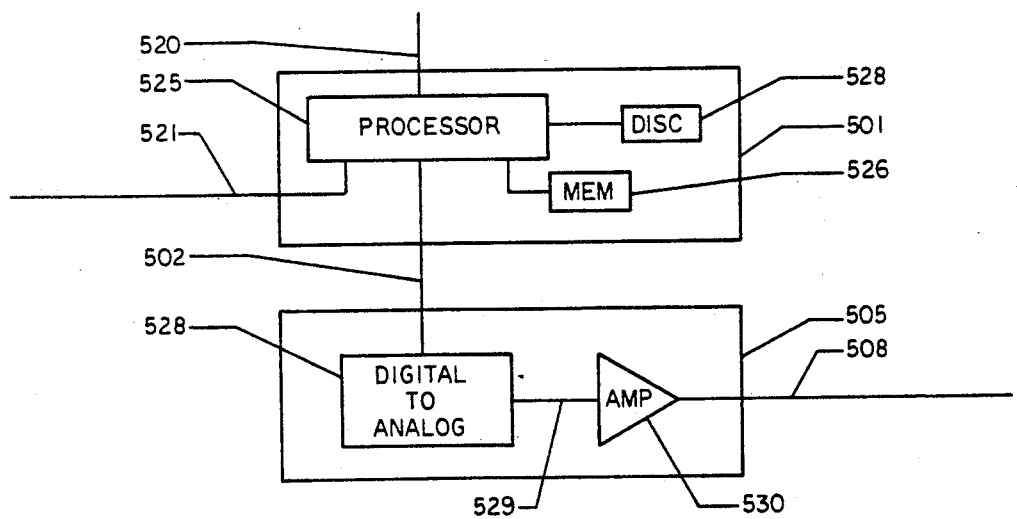
FIG. 7 is a block diagram representation of computer circuitry and interface circuitry for use with the computer arrangement of FIG. 6.

FIG. 7 is a block diagram representation of circuitry within a computer 501 and the interface 505. The computer 501 comprises a processor 525 and an associated memory 526. A disk store 528, which for example may be a standard floppy disk, is connected to the processor 525. The floppy disk may be loaded with data representing acoustical signals recorded from fish bait and a program for reading the data, described later herein with respect to FIG. 8. The information from the disk store 528 may be loaded in the memory 526 in a standard manner and the data representative of acoustical signals is read from the memory 526 and transmitted to a digital-to-analog convertor 528 in interface 505 by means of conductor 502. The digital-to-analog convertor is a standard device which, upon receipt of a data word, generates an analog output signal which is transmitted to amplifier 530 via conductor 529. The amplified signal is transmitted via conductor 508 to output transducer 506. Advantageously, the arrangement of this embodiment employing an on-board computer eliminates a number of the constraints encountered when the system is embodied in an underwater housing such as a lure or the like. By using the on-board equipment and a through-the-hull transducer such as transducer 506, no separate battery is required since the boat battery can be used and plenty of power will be available to drive the circuitry. Furthermore, the interface circuitry 505 may be constructed of discrete components which are generally less expensive than specially fabricated integrated circuitry. The transducer 506 may essentially be made as large as is desirable to broadcast the acoustical signals underwater over a large area. A number of such output transducers may be positioned in various places in or on the boat when desired. Alternatively, one or more loudspeaker-type output transducers may be enclosed in a watertight housing such as shown for example in FIG. 2 with an electrical conductor extending from the interface 505 to the housing. In that arrangement, all of the circuitry is still on board while the speakers may be suspended at various depths underwater. The circuitry on board may be either the computer-implemented arrangement shown in FIGS. 6 and 7 or the circuitry depicted for example in FIG. 4. In either case, a significant advantage of having the electronic circuitry on board is that the user may obtain different sound signatures from a memory. Furthermore, the memory device is readily replaced to allow the broadcasting of different sets of signatures in both the computer-implemented and the hard-wired configuration.

Figure 8:
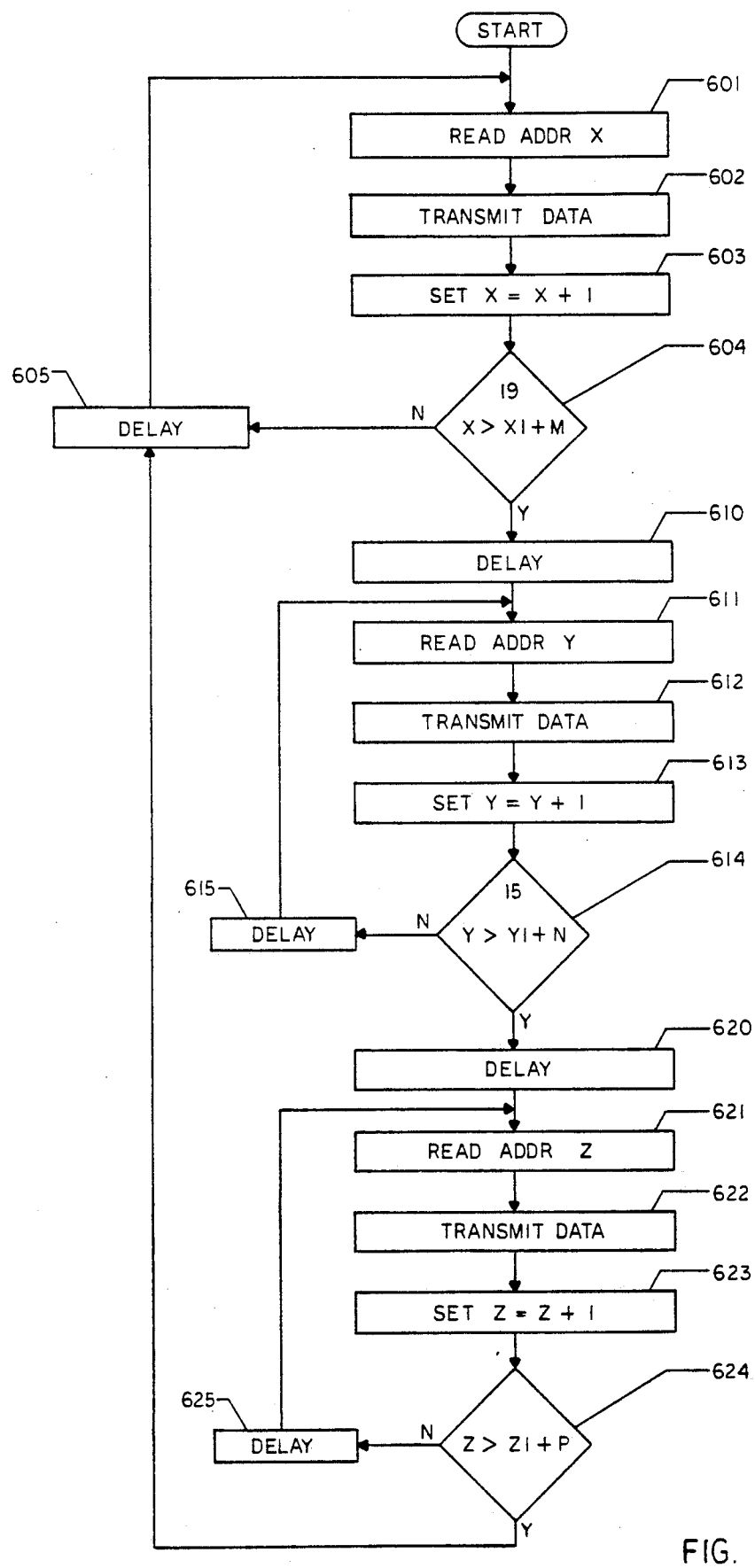
FIG. 8 is a flow-chart representation of a program for use in the computer arrangement of FIG. 6.
Figure 9:
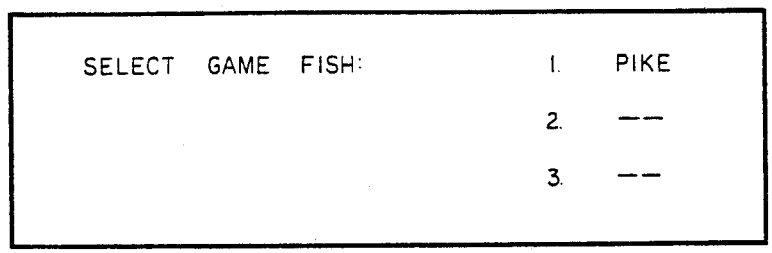
FIGS. 9 and 10 are representations of menus for use in the computer arrangement of FIG. 6.
Figure 10:
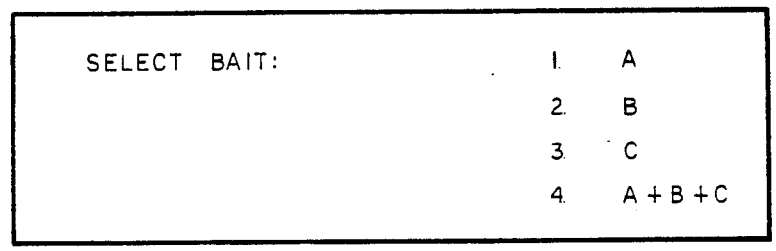

In the computer-implemented configuration shown in FIG. 6, a fisherman inserts a floppy disk which contains data representative of one or more signatures of fish bait. Different species of game fish have a preference for different species of bait and hence the floppy disk may include a program which provides a menu to the fisherman on the display screen 502 allowing the fisherman to select the game fish, by pressing a key on keyboard 503 or other input device. A representative menu is shown in FIG. 9. After having selected a game fish, the computer displays a second menu, shown by way of illustration in FIG. 10, allowing the fisherman to select between bait A, B or C or a combination of these baits. When such a bait has been selected, a program, initially provided on the disk and transferred by processor 525 to memory 526, is executed. A flow diagram representation of such a program is shown in FIG. 8. When the program is first entered at block 601 of FIG. 8, the processor 525 reads the appropriate memory location designated by an address X of the memory 526 and transmits the data obtained from the memory via conductor 502 to interface 505, as indicated in block 602. The first set of data, for example representing the signature for fish bait A, is stored in a number of memory locations, with the first location designated as X1 and the last location as X1+M. After transmitting data, as indicated in block 602, an advance is made to block 603 where the address to be used in the next memory read operation is incremented by 1. Thereafter, in block 604 a test is made to determine whether the newly computed address is greater than X1+M, as indicated in decision block 604. If not, the next address is still within the range of addresses containing data representative of the signature of a first fish bait. Since the processor 525 may run at a considerably greater speed than is necessary for the transmission of data to interface 505, a delay may be introduced as indicated in block 605. The duration of the delay is a matter of design choice depending upon the speed of the processor 525. If the test in block 604 indicates that the last computed address is greater than the last address of the range for the first fish bait, an advance is made to a second portion of the program represented by blocks 610 through 615. Blocks 611 through 615 refer to reading of the memory reserved for the storage of data of a second fish bait and function in a manner substantially identical to that described with respect to block 601 through 605. A delay 610 may be introduced to create a silent period between the transmission of the signature of the first fish bait and that of the second fish bait. If no silent period is desired, the delay may be set to zero. Otherwise it may be set to any desired time period. Blocks 620 through 625 represent a third section of the program used for reading data representative of the signature of a third fish bait from the memory 526. The section of the program defined by blocks 620 through 625 functions in substantially the same manner as that of blocks 610 through 615. Thus, the program depicted in FIG. 8 contains three sections for reading data representative of signatures of three different fish baits. It will be readily apparent that if only one fish bait is to be read, the decision in block 604 is not necessary and an advance can be made directly from block 603 to 605. Similarly, if the memory is to be read only for the signatures of two species of fish bait, an advance can be made from block 614 to block 605, omitting blocks 620 through 625. In any event, when all of the defined memory areas have been read, a return is made in each instance to the starting position, i.e., block 601, to repeat the sequence for as long as desired.

Figure 11:
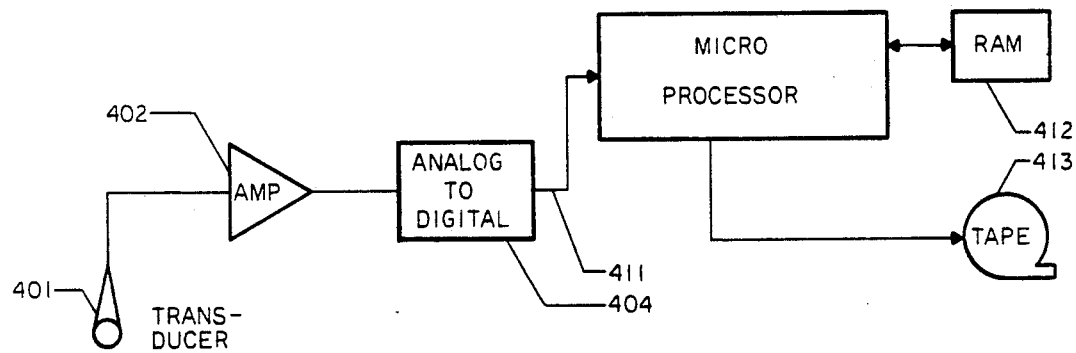
FIG. 11 is a block diagram representation of an illustrative system for recording underwater signals produced by fish bait.
Figure 12:
FIG. 12 is a block diagram of an illustrative arrangement for recording data collected in the system of FIG. 11.

Methods for recording underwater acoustical signals are well known. FIG. 11 shows one arrangement for recording underwater signatures produced by different species of bait or surface conditions. It includes an underwater acoustical transducer 401, the signals of which are fed to a standard amplifier 402 for amplification of the signal prior to application to an analog-to-digital convertor 404. Convertor 404 is a well-known and commercially available device which samples analog signals at a predetermined rate and generates corresponding digital representations. The convertor 404 will preferably be adjusted to sample the analog signal at a sampling rate which is twice the rate of the highest frequency component of the analog signal in order to obtain a true reproduction of the analog signal. Studies show that most fish are insensitive to underwater signals having a frequency above 10 kHz. Accordingly, a 20 kHz sampling rate for the convertor circuit 404 is adequate for most applications. The convertor circuit 404 periodically transmits a digital data word, comprising for example 8 data bits, to a processor 410 via the input bus 411. The processor 410 may for example be a well-known processor such as the Motorola 68000. The processor 410 stores the received data words in a random access memory (RAM) 412. After a segment of acoustical signals detected by the transducer 401 has been recorded in the RAM 412, the recording process may be interrupted and the contents of RAM 412 may be transferred to a ROM or a disk memory device such as a floppy disk. To facilitate the transfer of the data to the ROM or disk, the data may first be written to magnetic tape 413. The contents of the tape 413 is readily transferred to ROM 421, as depicted in FIG. 12, by means of a ROM writer 420, sometimes also referred to as a ROM burner. The ROM writer is a commercially available device for permanently recording digital data in a common integrated circuit ROM. Similar equipment is commercially available to write the data on a disk memory device.

It will be understood that the above-described embodiments are only illustrative of the invention and that numerous other configurations can be devised by those skilled in the art without departing from the spirit and scope of the invention.

What is claimed is:

1. A fish-attracting device comprising:
    a watertight housing;
    a memory disposed within said housing and storing digital data representative of prerecorded acoustical signals;
    memory access circuitry coupled to said memory for periodically reading digital data from said memory;
    an acoustical transducer disposed within said housing coupled to said circuitry and responsive to electrical analog signals to broadcast acoustical output signals corresponding to said prerecorded acoustical signals; and
    convertor circuitry coupled to said memory access circuitry and said transducer;
    said convertor circuitry responsive to digital data read from said memory to apply corresponding electrical analog signals to said transducer.

2. The device in accordance with claim 1 wherein said memory comprises a plurality of memory locations, each containing a data word comprising a predetermined number of digital data bits, and wherein said memory access circuitry comprises a timer circuit for generating periodic timing pulses, a memory address circuit responsive to said timing pulses for periodically addressing said memory locations and a data transfer circuit responsive to said timing pulses for periodically transferring data words from said memory to said convertor circuitry.

3. The device in accordance with claim 2 wherein said memory address circuit addresses said memory locations in a predetermined sequence and in repetitive cycles.

4. The device in accordance with claim 1 wherein said convertor circuitry comprises an amplifier coupled to said acoustical transducer for providing amplified electrical analog signals to said acoustical transducer.

5. The device in accordance with claim 1 wherein said memory access circuitry and said convertor circuitry comprise a single integrated circuit.

6. The device in accordance with claim 1 wherein data stored in said memory comprises data representative of prerecorded acoustical signals produced by live fish engaged in social behavior.

7. The device in accordance with claim 1 wherein data stored in said memory comprises data representative of prerecorded acoustical signals produced by live fish engaged in reproductive behavior.

8. The device in accordance with claim 1 wherein said memory stores digital data defining samples of signatures produced by an identified species of fish bait.

9. The device in accordance with claim 1 wherein said memory stores digital data defining first and second signatures of first and second species of fish bait, respectively, and said memory access circuitry reads data defining said first signature and data defining said second signature in sequence, whereby said device broadcasts signatures of first and second species of fish bait in sequence.

10. The device in accordance with claim 1 wherein said housing comprises a front section and a removable rear section and comprising at least one printed circuit board mounted therein and wherein said memory comprises an integrated circuit memory pluggably mounted on said circuit board and connected via said circuit board to said circuitry.

11. The device in accordance with claim 1 wherein said housing is provided with an opening covered by a watertight diaphragm and said acoustical transducer is aligned with said opening to broadcast said acoustical output signals through said diaphragm while said diaphragm is submerged.

12. The device in accordance with claim 1 wherein said housing comprises outer walls extending angularly to a plane extending generally parallel to a top surface of a body of water in which said housing is submerged, and further comprising an opening in said angularly extending wall and a watertight diaphragm covering said opening, and wherein said acoustical transducer means are aligned with said opening to transmit said acoustical output signals via said diaphragm.

13. The device in accordance with claim 1 wherein said acoustical transducer means comprises a plurality of loudspeakers.

14. The device in accordance with claim 1 wherein data stored in said memory comprises data representative of prerecorded acoustical signals produced by live fish bait underwater.

15. The device in accordance with claim 1 wherein said data stored in said memory comprises data representative of acoustical signals produced by disturbances at the water surface.

16. The device in accordance with claim 1 wherein data stored in said memory comprises digital data generated from acoustical signals detected underwater.

17. A fish-attracting device comprising:
a watertight housing;
a memory disposed within said housing and storing data representative of prerecorded acoustical signals;
circuitry disposed within said housing for obtaining data from said memory to generate corresponding electrical signals;
an acoustical transducer disposed within said housing coupled to said circuitry and responsive to said electrical signals to broadcast acoustical output signals corresponding to said prerecorded acoustical signals; and
an electrical connector;
said memory comprising conductors for pluggably engaging said connector;
whereby a memory having stored therein data representative of one type of prerecorded acoustical signals may be replaced by a memory having recorded therein data representative of another type of prerecorded acoustical signals and said device broadcasts acoustical signals corresponding to different types of prerecorded acoustical signals as defined by a pluggably removable memory.

18. The device in accordance with claim 17 wherein said memory comprises a non-volatile memory in which stored data is not affected when said memory is disengaged from said electrical connector.

19. The device in accordance with claim 17 wherein said means for interconnecting comprises a printed circuit board and wherein said memory comprises an integrated circuit memory having electrical conductors external to said integrated circuit memory for pluggably engaging said electrical connector.

20. The device in accordance with claim 10 wherein said housing is formed in the shape of a fishing lure and comprises means for attachment to a fishing line and wherein said one type of signal is generated by fish bait of one selected species and said other type of acoustical signals is generated by fish bait of a different species.

21. A fish-attracting arrangement comprising:
a digital computer having a memory storing digital data representative of prerecorded acoustical signals representing signatures of a plurality of known species of live bait;
an acoustical transducer connected to said computer for broadcasting acoustical signals underwater;
a display device connected to the computer;
said computer responsive to an input signal designating a species of live bait for displaying on said display device a menu identifying a plurality of known species of live bait and responsive to a further input signal identifying one of said species of live bait to transmit to said transducer data representing prerecorded acoustical signals produced by said identified species of live bait;
said transducer responsive to said transmitted data to broadcast acoustical signals corresponding to said prerecorded acoustical signals produced by said identified species of live bait.

22. The arrangement in accordance with claim 21 wherein said computer is responsive to input signals designating a plurality of species of live bait to transmit data representing prerecorded acoustical signals produced by each of said plurality of species of live bait to said transducer in a timed sequence.

* * * * *